(No Model.)
J. M. WATSON.
MACHINERY FOR SKIVING LEATHER.
No. 316,704. Patented Apr. 28, 1885.
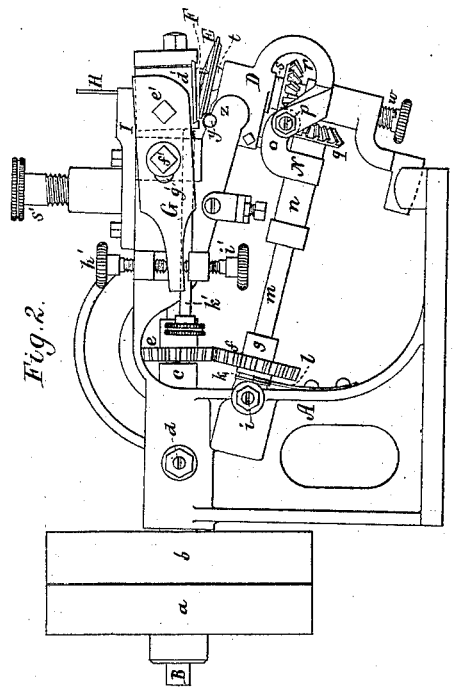
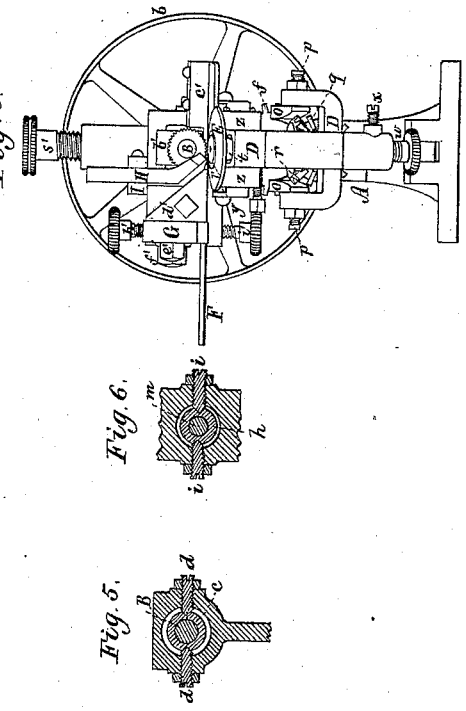
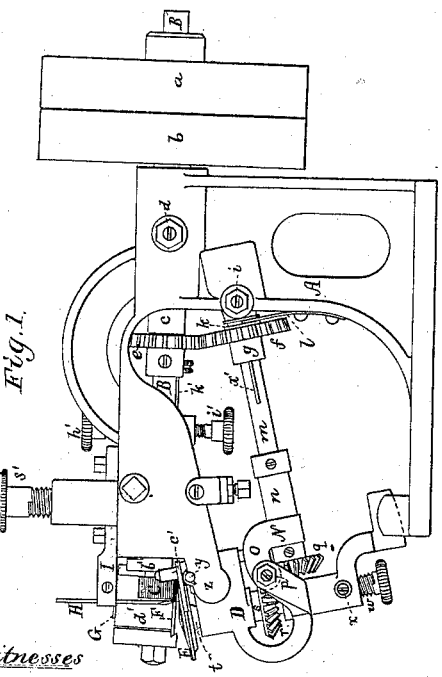
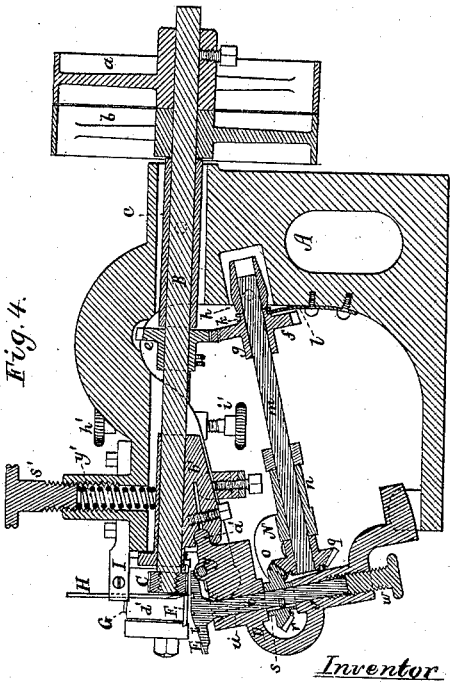
Witnesses
S. N. Piper
J. S. O'Gorman
Inventor
Jeremiah M. Watson.
by R. H. Eddy, atty.

UNITED STATES PATENT OFFICE.

JEREMIAH MEARS WATSON, OF SHARON, MASSACHUSETTS.

MACHINERY FOR SKIVING LEATHER.

SPECIFICATION forming part of Letters Patent No. 316,704, dated April 28, 1885.

Application filed February 20, 1885. (No model.)

*To all whom it may concern:*

Be it kown that I, JEREMIAH MEARS WATSON, of Sharon, in the county of Norfolk, of the Commonwealth of Massachusetts, have invented a new and useful Improvement in Machinery for Skiving Leather; and I do hereby declare the same to be described in the following specification, and represented in the accompanying drawings, of which—

Figures 1 and 2 are opposite side elevations, Fig. 3 a front view, and Fig. 4 a longitudinal section, of a skiving-machine embodying my invention, the nature of which is defined in the claims hereinafter presented. Fig. 5 is a transverse section of the box $c$, herein described, and the part of the frame A in which it is situated, such figure exhibiting the pivots $d\ d$ of such box. Fig. 6 is a transverse section of the sleeve $h$ and its supports, to be described.

In the said drawings, A is the frame of the machine, such frame having within the upper part of it a driving-shaft, B, provided at its outer portion with a "fast pulley," $a$, and a "loose pulley," $b$. The shaft is supported in a sleeve or box, $c$, that is pivoted near its middle to the frame, so as to be capable of tilting vertically therein, the pivots being shown at $d\ d$ in Figs. 1, 2, and 5. On the said shaft there is also fixed a bevel-gear, $e$, that engages with another bevel-gear, $f$, fixed upon and concentrically with a sleeve, $g$. The said sleeve encompasses a shaft, $m$, which at one end is supported and turns in a rock-shaft, $h$, pivoted to the frame, so as to be capable of tilting therein, the pivots being shown at $i\ i$ in Figs. 1, 2, and 6. The sleeve $g$ has a groove, $k$, extending around it near its rear end. A fork, $l$, fastened to the frame extends into such groove, in order to keep the sleeve in its proper position on the shaft $m$.

Extending into the sleeve and the bore of the rock-shaft is the shaft $m$, which is to slide freely lengthwise in the sleeve, and be connected therewith by a spline or feather, $x'$, so as to cause the shaft to revolve with the sleeve. The shaft $m$, near its front end, has a bearing in a supporting-fork, N, consisting of a sleeve, $n$, provided with arms $o\ o$, (see Figs. 1 and 2,) such arms being pivoted to a vibratory head, D, the pivots being shown at $p\ p$ in the said figures.

Fixed on the shaft $m$ at its front end is a bevel-gear, $q$, that engages with another such gear, $r$, fastened concentrically upon a short tubular shaft, $s$. The shaft $s$ is placed concentrically upon a spindle, $t$, and engages therewith by a "spline" or "feather" connection, by which the spindle is caused to revolve with the shaft, and is enabled to slide lengthwise therein. The spindle $t$ is supported in proper bearings, $u\ v$, in the vibratory head D, the lower one, $v$, being provided with a screw, $w$, that screws into the head D and serves to force the spindle upward within the head. There is in the head a set-screw, $x$, to screw against the adjusting-screw $w$ to clamp it, so as to prevent it from accidentally revolving. Fixed on the top of the spindle is a circular table, E, whose upper surface is conical, as represented. The vibratory head D swings lengthwise of the machine upon a pin, $y$, that goes through such head and two ears, $z\ z$, projecting from the frame A, as shown. The head at its upper inner corner is jointed, as represented at $a'$, to a block, $b'$, that hangs from the driving-shaft B, and is adapted to move or slide vertically within the frame A, the shaft B going through the block and turning therein. The pivots $p\ p$ range with or about with the junction of the pitch-circles of the bevel-gears $q$ and $r$.

Immediately over the block $b'$ there is screwed down into the frame A and against the upper end of a spiral spring, $y'$, resting upon the block, a screw, $s'$, which on being screwed down serves to depress the block and the driving-shaft and the feed-wheel at the front end of the latter. Such feed-wheel projects over the rotary table E.

There is to the block $b'$ a gage, $c'$, against which a piece of leather while being skived bears at its rear edge. The skiving-knife is represented at F, it being clamped to a carrier or block, $d'$, that is held to a lever, G, by a clamp-screw, $e'$, which goes through the lever and screws into the block. This lever is fulcrumed to the frame A by means of a screw, $f'$, that goes through a short slot, $g'$, in the lever and screws into the frame, the slot being to enable the lever to have a slight endwise play. The tail of the lever goes between two adjusting-screws, $h'\ i'$, each of which screws through the frame A and against the lever, one, as shown, bearing on the top and the other against the bottom of the tail of the lever. Furthermore, a long screw, $k'$, arranged horizontally in the frame A, screws therein against the inner end of the skiving-knife block $d'$ in order to tip or turn such block upon its supporting-screw for the purpose of adjusting the cutting-edge of the knife to a greater or less angle with the top of the rotary table. It is also to adjust the knife to the gage.

Directly in front of the feed-wheel there is, as represented, another knife, H, which, inclined as shown, is to cut through the shaving or part removed from the piece of leather while being skived. The knife H is to reduce such shaving or part to a uniform width, in order for it to be used as a "rand," such as shoemakers employ for the purpose of "leveling up" the outer sole of a shoe in the part thereof on which the heel is to be fixed. The knife H is supported in an arm, I, that projects from the frame A, which arm I generally apply to the frame, so as to be adjustable thereon in a manner to carry the knife toward or from the gage or up and down, as occasion may require, to cause it to cut the rand or shaving, as may be required.

In the upper surface of the table E is a circular groove, $l'$, into which the point of the knife H may extend when the machine is used for cutting successively strips from a sheet of leather, and splitting each strip diagonally crosswise of it in order to reduce it to two rands.

With the machine as described a piece of leather or other suitable material may be skived, the machine adapting itself to the piece whether it be thick or thin, and making a wider bevel on a thin piece in proportion to what will be produced in a thicker one. As the piece goes between the feed-wheel and the rotary table it will, in proportion to its thickness, press the feed-wheel upward and tip the latter downward relatively to the knife. As the feed-wheel rises the block $b'$ will be forced upward, and by being hinged to the vibratory head D will tip such head on its pin $y$, so as to tip the piece of leather into a proper position for the knife to pass through it and cut it to the desirable bevel, as its thickness may require. As the vibratory head D is tipped on its pin $y$ the shaft $m$ will be moved more or less lengthwise in the sleeve $g$, which, when revolved, will revolve the shaft.

In using the machine the piece of leather to be skived is to be borne edgewise against the gage and inserted end foremost between the feed-wheel and the rotary table while they may be in revolution. By them it will be borne against the cutting-edge of the skiving-knife and be skived thereby, the auxiliary knife in the meantime acting to reduce the shaving to or about a uniform width.

I do not claim a skiving-machine provided with a feed-wheel, a rotary table, and a skiving-knife, such being common to various skiving-machines.

I claim—

1. In combination with the driving-shaft B and the feed-wheel C thereon, and with the rotary table E and its spindle $t$, the vertically-movable box or block $b'$, carried by the said shaft, and the vibratory head D, hinged to such block and to the frame of the machine and provided with mechanism for revolving the said spindle, such mechanism, as represented, consisting of the tilting sleeve or box $c$, bevel-gears $e\,f$, grooved sleeve $g$, rock-shaft $h$, fork $l$, shaft $m$, fork N, gears $q$ and $r$, and tubular shaft $s$, the bevel-gear $e$ being fixed on the driving-shaft, and all being substantially as set forth.

2. The combination, essentially as described, for revolving the spindle of the rotary table, such consisting of the tilting sleeve or box $c$, bevel-gears $e\,f$, grooved sleeve $g$, rock-shaft $h$, fork $l$, shaft $m$, fork N, gears $q$ and $r$, and tubular shaft $s$, the gear $e$ being fixed on the driving-shaft, and all being arranged as represented.

3. The combination of the knife H with the gage, the skiving-knife, and the feed-wheel, and with the rotary table having a circular groove in it, as described, to receive the point of the said knife, such feed-wheel and table being provided with mechanism for operating them, substantially as set forth, relatively to the said knives.

4. The combination of the skiving-knife carrier or supporting-block $d'$ with the lever G, pivoted to such block, fulcrumed to the machine-frame, and provided with adjusting-screws $h'\,i'$, as set forth, and with the screw $k'$, arranged in the said frame and to bear against the knife-carrier, all being substantially and to operate as represented.

JEREMIAH MEARS WATSON.

Witnesses:
R. H. EDDY,
ERNEST B. PRATT.